(12) United States Patent
Fu et al.

(10) Patent No.: US 9,942,714 B2
(45) Date of Patent: Apr. 10, 2018

(54) METHOD AND APPARATUS FOR SELECTING A POSITIONING SCHEME, METHOD AND APPARATUS FOR CONTROLLING A POSITIONING SCHEME TO BE SELECTED

(71) Applicant: CHINA ACADEMY OF TELECOMMUNICATIONS TECHNOLOGY, Beijing (CN)

(72) Inventors: Jing Fu, Beijing (CN); Haiyang Quan, Beijing (CN); Jing Liang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/125,577

(22) PCT Filed: Mar. 12, 2015

(86) PCT No.: PCT/CN2015/074099
§ 371 (c)(1),
(2) Date: Sep. 12, 2016

(87) PCT Pub. No.: WO2015/135486
PCT Pub. Date: Sep. 17, 2015

(65) Prior Publication Data
US 2017/0006426 A1  Jan. 5, 2017

(30) Foreign Application Priority Data
Mar. 13, 2014 (CN) .......................... 2014 1 0093063

(51) Int. Cl.
*H04W 4/02* (2009.01)
*H04W 64/00* (2009.01)
(Continued)

(52) U.S. Cl.
CPC ........... *H04W 4/026* (2013.01); *H04W 24/08* (2013.01); *H04W 64/00* (2013.01);
(Continued)

(58) Field of Classification Search
CPC ....... H04W 64/00; H04W 4/02; H04W 4/028; H04W 4/023; H04W 4/025; H04W 4/026;
(Continued)

(56) References Cited

U.S. PATENT DOCUMENTS

2007/0281662 A1* 12/2007 Kim ........................ H04W 4/02
455/404.2
2011/0250906 A1  10/2011 Siomina et al.
(Continued)

FOREIGN PATENT DOCUMENTS

CN       1984476 A      6/2007
CN     101083796 A     12/2007
(Continued)

OTHER PUBLICATIONS

ERiCSSON: "Update of overall architecture due to SAE and other Rel-8 work", 3GPP TSG-SA2 Meeting #67, S2-085589, pp. 66, Sophia Antipolis, France (Aug. 25-29, 2008).
(Continued)

*Primary Examiner* — Daniel Lai
(74) *Attorney, Agent, or Firm* — Womble Bond Dickinson (US) LLP (57) ABSTRACT

The present invention provides a method and device for transmission on unlicensed spectrum in a UE and a base station. In view of the problem of DFS constraints and PHICH resource waste that is caused by communication of an uplink synchronous HARQ on unlicensed spectrum, in the present invention, logical information is configured so that PUSCHs transmitted through different sub-frames on different physical carriers form one logical carrier, and
(Continued)

PHICH resources are reserved for the logical carrier. As an embodiment, downlink signaling is sent in a sub-frame for sending a PHICH so as to indicate transmission bandwidth for data retransmission. The solution provided in the present invention saves PHICH resources and eliminates the constraints on the DFS by the synchronous HARQ. Besides, the present invention reuses the CA scheme in the existing LTE as much as possible, and has high compatibility.

4 Claims, 3 Drawing Sheets

(51) Int. Cl.
    *H04W 24/08* (2009.01)
    *H04W 72/08* (2009.01)
    *H04W 72/10* (2009.01)
    *H04J 11/00* (2006.01)
    *H04W 88/02* (2009.01)

(52) U.S. Cl.
    CPC ......... *H04W 72/085* (2013.01); *H04W 72/10* (2013.01); *H04J 11/00* (2013.01); *H04W 88/02* (2013.01)

(58) Field of Classification Search
CPC ... H04W 24/08; H04W 72/085; H04W 72/10; H04W 88/02; H04J 11/00
See application file for complete search history.

(56) References Cited

U.S. PATENT DOCUMENTS

| | | | |
|---|---|---|---|
| 2013/0190009 A1 | 7/2013 | Johansson | |
| 2014/0094232 A1* | 4/2014 | Framel | H04W 4/028 |
| | | | 463/6 |

FOREIGN PATENT DOCUMENTS

| | | |
|---|---|---|
| CN | 101925104 A | 12/2010 |
| CN | 101990297 A | 3/2011 |
| CN | 102348160 A | 2/2012 |
| CN | 103313185 A | 9/2013 |
| JP | 2015097328 A * | 5/2015 |
| WO | WO 2008/046266 A1 | 4/2008 |

OTHER PUBLICATIONS

Supplementary European Search Report, for counterpart EP application No. EP 15 76 0953, dated Jan. 26, 2017.
PCT International Search Report for PCT Counterpart Application No. PCT/CN2015/074099, 5 pp. (including English translation), (dated Jun. 3, 2015).
PCT Written Opinion of the International Searching Authority for PCT Counterpart Application No. PCT/CN2015/074099, 4 pp., (dated Jun. 3, 2015).
The State IP Office of China, "First Office Action," for Chinese Patent Application No. 201410093063.6, dated Nov. 6, 2017, 8 pgs., Beijing, CN.

* cited by examiner

METHOD AND APPARATUS FOR SELECTING A POSITIONING SCHEME, METHOD AND APPARATUS FOR CONTROLLING A POSITIONING SCHEME TO BE SELECTED

CROSS-REFERENCE TO RELATED APPLICATIONS

This patent application is a U.S. National Phase Application under 35 U.S.C. § 371 of International Application No. PCT/CN2015/074099, filed on Mar. 12, 2015, entitled SELECTION OF POSITIONING METHOD, AND CONTROL METHOD AND APPARATUS FOR SAME, which claims the benefit of Chinese Patent Application No. 201410093063.6, filed with the Chinese Patent Office on Mar. 13, 2014, and entitled "Selection of positioning method, and control method and apparatus for same", which was incorporated by reference in its entirety.

FIELD

The present invention relates to the field of communications, and particularly to a method and apparatus for selecting a positioning scheme, and a method and apparatus for controlling a positioning scheme to be selected.

BACKGROUND

If a User Equipment (UE) is Global Navigation Satellite (GNSS) enabled, e.g., a Global Positioning System (GPS) enabled, then the current position of the UE can be obtained directly using the GPS, which can be referred to as stand-alone GNSS positioning.

Since the GNSS is costly, and a GNSS signal significantly fades in an indoor scenario, the scheme of cellular network signal or cellular network aided positioning of the UE has been proposed in the prior art, i.e., the Location Service (LCS).

Figure 1:
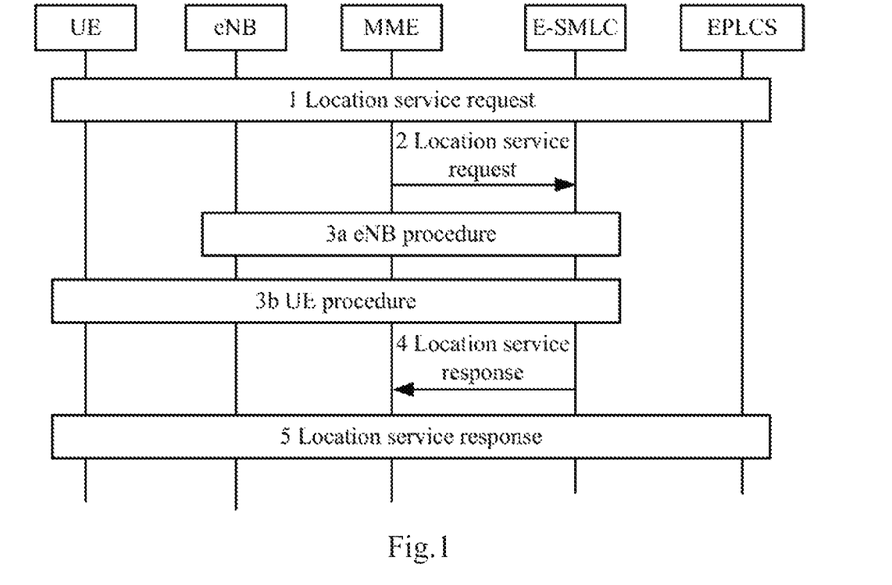
FIG. 1 is a schematic flow chart of positioning in the LTE control plane in the prior art.

FIG. 1 illustrates a flow of positioning in the control plane of the LTE LCS, where the flow includes the following steps:

1. A Mobility Management Entity (MME) receives a location service request, which can be a request initiated by the UE to the MME in a Non Access Stratum (NAS) message, or a location service request initiated in some entity (e.g., a Gateway Mobile Location Center (GMLC)) in an Evolved Packet Core (EPC), or the MME.

2. The MME transmits the location service request to an Evolved Service Mobile Location Center (E-SMLC), and the E-SMLC selects an appropriate positioning scheme according to a Quality of Service (QoS) including accuracy and time-delay of positioning, carried in the location service request.

3a. The E-SMLC may trigger an evolved Node B (eNB) related positioning procedure as specified in the LTE Positioning Protocol Annex (LPPa), for example, obtain assistance data required for positioning, or a measurement required for positioning;

3b. The E-SMLC may trigger a UE related positioning procedure as specified in the LIE Positioning Protocol (UV), for example, obtain a position estimation, assistance data required for positioning, or a measurement required for positioning;

4. The E-SMLC transmits a location service response including some desirable results, e.g., the position of the UE, a positioning success or failure indicator, to the MIME; and 5. The MME returns the location service response to a target entity.

Positioning schemes supported for positioning in the control plane will be briefed below.

The existing positioning schemes supported for positioning in the control plane of the LTE LCS includes the following options:

Firstly the position of the UE is calculated according to known serving cell geographical information together with other measurement information based upon a cell identifier (ID), e.g., in the Time Advance (TA) plus Angle of Arrival (APA) scheme;

Secondly the UE listens concurrently to pilot signals of a number of eNBs, obtains the difference in time of arrival between the signals of the eNBs, and determines the position of the UE in more than two hyperbolic equations, e.g., in the Observed Time Difference of Arrival (OTDOA) and in the Uplink Time Difference of Arrival (UTDOA) scheme; and Thirdly there is a scheme of network assisted positioning by a global satellite navigation system including a GPS system, a Galileo system, or another available positioning system. In the A-GNSS scheme, the workload of UE is operationally simplified in that a position calculation center at the network side interoperates with the UE to position the UE. For example, the network side can estimate from the preliminary position of the UE an operating condition of a satellite above the position, e.g., ephemeris, almanac, and differential calibration, and other information, and transmit the operating condition to the UE. The UE can optimize searching and positioning procedures using the operating condition as priori knowledge to thereby achieve the effects of shortening a period of time for searching, lowering the required level of a search signal, and other effects so as to improve the performance of positioning.

As smart phones are being popularized, business opportunities of indoor positioning are gradually emerging, but also faced with their challenge, for example, currently widely GPS positioning may not position successfully the smart phone indoors due to the unavailability of a satellite signal; and if the smart phone is positioned indoors using a cellular network signal, then the smart phone may be positioned less precisely in the indoor NLOS environment. Consequently other positioning schemes may be introduced in addition to the several existing positioning schemes for positioning in the LTE control plane.

There is a scheme of positioning based upon a WLAN signal. At present a WLAN is deployed by an operator to offload cellular network traffic, so the UE can be positioned indoors more precisely over the deployed WLAN.

There is a scheme of positioning using a Pseudo-Satellite or Pseduolite (PL). In response to a demand for indoor positioning, some transmitter is arranged indoors on the ground to transmit some positioning signal, which is typically a GPS-like signal, so that the UE can receive the pseudo-satellite signal for indoor positioning.

In summary, there are a number of positioning schemes supported for positioning in the LTE control plane, and the number of supported positioning schemes may be increasing along with subsequent evolvement of the technologies. The surrounding environment of the UE while moving may be changing constantly so that the appropriate positioning schemes available to the UE may also be changing. For example, if the outdoor UE grooves into a shopping mall in which there is an offloading WLAN in addition to a cellular eNB, then the A-GNSS positioning scheme applied outdoors to the UE may not be available, but the UE will be positioned over the WLAN; or if the UE moves from an indoor environment in which only a cellular eNB is deployed, to an indoor environment in which a pseudo-satellite is deployed, then the UE will be switched from the scheme of positioning using the cellular eNB to the scheme of positioning using the pseudo-satellite for a more precise result of indoor positioning. There has been absent so far a feasible solution to seamless switching of the positioning scheme for the UE to be positioned in the control plane.

SUMMARY

Embodiments of the invention provide a method and apparatus for selecting a positioning scheme, and a method and apparatus for controlling a positioning scheme to be selected, so as to enable the UE to select the positioning scheme, thus switching seamlessly the positioning scheme.

An embodiment of the invention provides a method for controlling a positioning scheme to be selected, the method including:

determining, by a location server, assistance data to instruct a UE to select a positioning scheme according to a location service request; and transmitting, by the location server, the assistance data to the UE.

With this method, the UE can select appropriate one of the positioning schemes according to received assistance data for switching between the positioning schemes (i.e., the assistance data for selecting a positioning scheme) to thereby switch seamlessly the positioning scheme.

Preferably the assistance data includes a priority and/or a positioning condition corresponding to respective one of positioning schemes currently supported by the UE;

wherein the priority is a priority at which the UE is instructed to select the respective positioning scheme, and the positioning condition is a respective positioning condition to be satisfied by the positioning scheme which the UE is instructed to select at the priority, wherein if the positioning condition is satisfied, then it will be determined that the positioning scheme is selected; otherwise, another positioning scheme will be further selected at the priority thereof.

Preferably determining, by the location server, from the location service request the assistance data to instruct the User Equipment (UE) to select a positioning scheme includes:

determining, by the location server, the assistance data to instruct the UE to select one of the positioning schemes, according to a Quality of Service (QoS) parameter of the location service carried in the location service request, a current serving cell or positional information of the UE, and positioning capabilities of the UE and the network side.

Preferably the location server decides whether to update and transmit the assistance data to the UE, according to an updated serving cell of the UE, and a previous result of positioning the UE upon reception of a location update message.

An embodiment of the invention provides a method for selecting a positioning scheme, the method including:

receiving, by a UE, assistance data transmitted by a location server to instruct the UE to select a positioning scheme; and selecting, by the UE, a positioning scheme according to the assistance data.

With this method, the UE can select appropriate one of the positioning schemes according to received assistance data for switching between the positioning schemes (i.e., the assistance data for selecting a positioning scheme) to thereby switch seamlessly the positioning scheme.

Preferably the assistance data includes a priority and/or a positioning condition corresponding to respective one of positioning schemes currently supported by the UE;

wherein the priority is a priority at which the UE is instructed to select the respective positioning scheme, and the positioning condition is a respective positioning condition to be satisfied by the positioning scheme which the UE is instructed to select at the priority, wherein if the positioning condition is satisfied, then it will be determined that the positioning scheme is selected; otherwise, another positioning scheme will be further selected at the priority thereof.

Preferably if the assistance data includes the priority and the positioning condition corresponding to respective one of the positioning schemes currently supported by the UE, then selecting, by the UE, one of the positioning schemes according to the assistance data includes:

selecting, by the UE, one of the positioning schemes in an order of descending priorities from high to low, and determining whether the selected positioning scheme satisfies the positioning condition corresponding to the positioning scheme, and if so, then performing a positional measurement according to the selected positioning scheme, and reporting a measurement result; otherwise, selecting respective one of the positioning schemes sequentially in an order of descending priorities from high to low, and determining whether the selected positioning scheme satisfies the positioning condition corresponding to the positioning scheme until the selected positioning scheme satisfies the corresponding positioning scheme, and performing a positional measurement according to the finally selected positioning scheme, and reporting a measurement result.

Preferably if the assistance data includes the priority and the positioning condition corresponding to respective one of the positioning schemes currently supported by the UE, then selecting, by the UE, one of the positioning schemes according to the assistance data includes:

determining, by the UE, whether the lastly selected positioning scheme still satisfies the corresponding positioning condition;

if so, then still performing a positional measurement according to the lastly selected positioning scheme, reporting a measurement result, and determining whether there is a positioning scheme at a higher priority than the priority of the lastly selected positioning scheme, and satisfying the corresponding positioning condition, and if so, then performing a positional measurement according to the positioning scheme, and reporting a measurement result; and if the lastly selected positioning scheme does not satisfy the corresponding positioning condition, and/or there is no positioning scheme at a higher priority than the priority of the lastly selected positioning scheme, and satisfying the corresponding positioning condition, then determining whether there is a positioning scheme at a lower priority than the priority of the lastly selected positioning scheme or at the same priority as the priority of the lastly selected positioning scheme, and satisfying the corresponding positioning condition, and if so, then performing a positional measurement according to the positioning scheme, and reporting a measurement result.

An embodiment of the invention provides an apparatus for controlling a positioning scheme to be selected, the apparatus including;

an assistance data determining unit configured to determine assistance data to instruct a UE to select a positioning scheme according to a location service request; and a transmitting unit configured to transmit the assistance data to the UE.

With this apparatus, the UE can select appropriate one of the positioning schemes according to received assistance data for switching between the positioning schemes to thereby switch seamlessly the positioning scheme.

Preferably the assistance data includes a priority and/or a positioning condition corresponding to respective one of positioning schemes currently supported by the UE;

wherein the priority is a priority at which the UE is instructed to select the respective positioning scheme, and the positioning condition is a respective positioning condition to be satisfied by the positioning scheme which the UE is instructed to select at the priority, wherein if the positioning condition is satisfied, then it will be determined that the positioning scheme is selected; otherwise, another positioning scheme will be further selected at the priority thereof.

Preferably the assistance data determining unit is configured:

to determine the assistance data to instruct the UE to select one of the positioning schemes, according to a Quality of Service (QoS) parameter of the location service carried in location service request, a current serving cell or positional information of the UE, and positioning capabilities of the UE and the network side.

Preferably the transmitting unit is configured to decide to transmit the assistance data to the UE, according to an updated serving cell of the UE, and a previous result of positioning the UE upon reception of a location update message.

An embodiment of the invention provides a location server including:

a processor configured to read program stored in a memory to perform the process of:

determining assistance data to instruct a UE to select a positioning scheme according to a location service request; and transmitting the assistance data to the UE through a transceiver, wherein:

the transceiver is configured to be controlled by the processor to receive and transmit data; and the memory is configured to store data for use by the processor in operation.

With this location server, the UE can select appropriate one of the positioning schemes according to received assistance data for switching between the positioning schemes to thereby switch seamlessly the positioning scheme.

Preferably the assistance data includes a priority and/or a positioning condition corresponding to respective one of positioning schemes currently supported by the UE;

wherein the priority is a priority at which the UE is instructed to select the respective positioning scheme, and the positioning condition is a respective positioning condition to be satisfied by the positioning scheme which the UE is instructed to select at the priority, where if the positioning condition is satisfied, then it will be determined that the positioning scheme is selected; otherwise, another positioning scheme will be further selected at the priority thereof.

Preferably the processor configured to determine the assistance data to instruct the UE to select one of the positioning schemes is configured to read the program stored in the memory to perform the process of:

determining the assistance data to instruct the UE to select one of the positioning schemes, according to a Quality of Service (QoS) parameter of the location service carried in the location service request, a current serving cell or positional information of the UE, and positioning capabilities of the UE and the network side.

Preferably the processor configured to transmit the assistance data to the UE through the transceiver is configured to read the program stored in the memory to perform the process of: deciding whether to update and transmit the assistance data to the UE, according to an updated serving cell of the UE, and a previous result of positioning the UE upon reception of a location update message.

An embodiment of the invention provides an apparatus for selecting a positioning scheme, the apparatus including:

a receiving unit configured to receive assistance data transmitted by a location server to instruct the selecting apparatus to select a positioning scheme; and a selecting unit configured to select a positioning scheme according to the assistance data.

With this apparatus, the UE can select appropriate one of the positioning schemes according to received assistance data for switching between the positioning schemes to thereby switch seamlessly the positioning scheme.

Preferably the assistance data includes a priority and/or a positioning condition corresponding to respective one of positioning schemes currently supported by the UE;

wherein the priority is a priority at which the LIE is instructed to select the respective positioning scheme, and the positioning condition is a respective positioning condition to be satisfied by the positioning scheme which the UE is instructed to select at the priority, wherein if the positioning condition is satisfied, then it will be determined that the positioning scheme is selected; otherwise, another positioning scheme will be further selected at the priority thereof.

Preferably if the assistance data includes the priority and the positioning condition corresponding to respective one of the positioning schemes currently supported by the UE, then the selecting unit is configured:

to select one of the positioning schemes in an order of descending priorities from high to low, and to determine whether the selected positioning scheme satisfies the positioning condition corresponding to the positioning scheme, and if so, to perform a positional measurement according to the selected positioning scheme, and to report a measurement result; otherwise, to select respective one of the positioning schemes sequentially in an order of descending priorities from high to low, and to determine whether the selected positioning scheme satisfies the positioning condition corresponding to the positioning scheme until the selected positioning scheme satisfies the corresponding positioning scheme, and to perform a positional measurement according to the finally selected positioning scheme, and to report a measurement result.

Preferably if the assistance data includes the priority and the positioning condition corresponding to respective one of the positioning schemes currently supported by the UE, then the selecting unit is configured:

to determine whether the lastly selected positioning scheme still satisfies the corresponding positioning condition;

if so, to still perform a positional measurement according to the lastly selected positioning scheme, to report a measurement result, and to determine whether there is a positioning scheme at a higher priority than the priority of the lastly selected positioning scheme, and satisfying the corresponding positioning condition, and if so, to perform a positional measurement according to the positioning scheme, and to report a measurement result; and if the lastly selected positioning scheme does not satisfy the corresponding positioning condition, and/or there is no positioning scheme at a higher priority than the priority of the lastly selected positioning scheme, and satisfying the corresponding positioning condition, to determine whether there is a positioning scheme at a lower priority than the priority of the lastly selected positioning scheme or at the same priority as the priority of the lastly selected positioning scheme, and satisfying the corresponding positioning condition, and if so, to perform a positional measurement according to the positioning scheme, and report a measurement result.

An embodiment of the invention provides a UE including:

a processor configured to read program stored in a memory to perform the process of:

receiving assistance data transmitted by a location server to instruct the UE to select a positioning scheme, through a transceiver; and selecting a positioning scheme according to the assistance data, wherein:

the transceiver is configured to be controlled by the processor to receive and transmit data; and the memory is configured to store data for use by the processor in operation.

The UE can select appropriate one of the positioning schemes according to received assistance data for switching between the positioning schemes to thereby switch seamlessly the positioning scheme.

Preferably the assistance data includes a priority and/or a positioning condition corresponding to respective one of positioning schemes currently supported by the UE;

wherein the priority is a priority at which the UE is instructed to select the respective positioning scheme, and the positioning condition is a respective positioning condition to be satisfied by the positioning scheme which the UE is instructed to select at the priority, where if the positioning condition is satisfied, then it will be determined that the positioning scheme is selected; otherwise, another positioning scheme will be further selected at the priority thereof.

Preferably if the assistance data includes the priority and the positioning condition corresponding to respective one of the positioning schemes currently supported by the UE, then the processor configured to select one of the positioning schemes according to the assistance data is configured to read the program stored in the memory to perform the process of:

selecting one of the positioning schemes in an order of descending priorities from high to low, and determining whether the selected positioning scheme satisfies the positioning condition corresponding to the positioning scheme, and if so, then performing a positional measurement according to the selected positioning scheme, and reporting a measurement result; otherwise, selecting respective one of the positioning schemes sequentially in an order of descending priorities from high to low, and determining whether the selected positioning scheme satisfies the positioning condition corresponding to the positioning scheme until the selected positioning scheme satisfies the corresponding positioning scheme, and performing a positional measurement according to the finally selected positioning scheme, and reporting a measurement result.

Preferably if the assistance data includes the priority and the positioning condition corresponding to respective one of the positioning schemes currently supported by the UE, then the processor configured to select one of the positioning schemes according to the assistance data is configured to read the program stored in the memory to perform the process of:

determining whether the lastly selected positioning scheme still satisfies the corresponding positioning condition;

if so, then still performing a positional measurement according to the lastly selected positioning scheme, reporting a measurement result, and determining whether there is a positioning scheme at a higher priority than the priority of the lastly selected positioning scheme, and satisfying the corresponding positioning condition, and if so, then performing a positional measurement according to the positioning scheme, and reporting a measurement result; and if the lastly selected positioning scheme does not satisfy the corresponding positioning condition, and/or there is no positioning scheme at a higher priority than the priority of the lastly selected positioning scheme, and satisfying the corresponding positioning condition, then determining whether there is a positioning scheme at a lower priority than the priority of the lastly selected positioning scheme or at the same priority as the priority of the lastly selected positioning scheme, and satisfying the corresponding positioning condition, and if so, then performing a positional measurement according to the positioning scheme, and reporting a measurement result.

DETAILED DESCRIPTION OF THE EMBODIMENTS

Embodiments of the invention provide a method and apparatus for selecting a positioning scheme, and a method and apparatus for controlling a positioning scheme to be selected, so as to enable the UE to select the positioning scheme, thus switching seamlessly the positioning scheme.

There are a number of positioning schemes at present, and since the environment of the UE while moving is changing, for example, the outdoor UE moves into an indoor environment, the UE in an indoor WIFI environment moves into an indoor environment in which only an eNB is displayed, the positioning schemes available to the UE may be changing. An embodiment of the invention provides a method for switching seamlessly a positioning scheme in the control plane positioning architecture. Generally a location server transmits assistance data for switching between positioning schemes to a UE; and the UE selects appropriate one of the positioning schemes according to the received assistance data for switching the positioning schemes, and transmits a corresponding positional measurement result to the network side for the network side to calculate positional information of the UE satisfying a required QoS.

Here the assistance data includes a priority and/or a positioning condition corresponding to respective one of positioning schemes currently supported by the UE;

Here the priority is a priority at which the UE is instructed to select the respective positioning scheme, and the positioning condition is a respective positioning condition to be satisfied by the positioning scheme which the UE is instructed to select at the priority, where if the positioning condition is satisfied, then it will be determined that the positioning scheme is selected; otherwise, another positioning scheme will be further selected at the priority thereof.

The positioning condition includes a positioning threshold, for example, if the positioning condition includes a preset positioning threshold of 3 in the OTDOA positioning scheme, then if there are three positional measurement results of the UE positioned in the OTDOA scheme, then it will be determined that the positioning condition corresponding to the OTDOA scheme is satisfied.

The positioning condition can further include other parameters, for example, if the positioning condition includes a preset positioning threshold of 2 in the WLAN positioning scheme, and an SSID corresponding to the detected WLAN is a preset specific SSID, then if the UE detects two WLAN signals broadcasting the specific SSID, then it will be determined that the positioning condition is the positioning condition corresponding to the WLAN positioning scheme.

Here the assistance data for switching between the positioning schemes, transmitted by the location server to the UE are determined response to a location service request. Preferably the location server determines assistance data to instruct the UE to select one of the positioning schemes (i.e., the assistance data for switching between the positioning schemes), in response to the location service request as follows:

The location server determines assistance data to instruct the UE to select one of the positioning schemes, according to a QoS parameter carried in the location service request, a current serving cell or positional information of the UE, and positioning capabilities of the UE and the network side.

Preferably the location server decides whether to update and transmit the assistance data to the UE, according to an updated serving cell of the UE, and a previous result of positioning the UE upon reception of a location update message.

If the assistance data includes the priority and the positioning condition corresponding to respective one of the positioning schemes currently supported by the UE, then the UE will select one of the positioning schemes according to the assistance data as follows:

The UE selects one of the positioning schemes in an order of descending priorities from high to low, and determines whether the selected positioning scheme satisfies the positioning condition corresponding to the positioning scheme, and if so, then the UE will perform a positional measurement according to the selected positioning scheme, and report a measurement result; otherwise, the UE will select respective one of the positioning schemes sequentially in an order of descending priorities from high to low, and determine whether the selected positioning scheme satisfies the positioning condition corresponding to the positioning scheme until the selected positioning scheme satisfies the corresponding positioning scheme, and the UE will perform a positional measurement according to the finally selected positioning scheme, and report a measurement result.

Alternatively if the assistance data includes the priority and the positioning condition corresponding to respective one of the positioning schemes currently supported by the UE, then the UE will select one of the positioning schemes according to the assistance data as follows:

The UE determines whether the lastly selected positioning scheme still satisfies the corresponding positioning condition;

If so, then the UE will still perform a positional measurement according to the lastly selected positioning scheme, and report a measurement result, and the UE determines whether there is a positioning scheme at a higher priority than the priority of the lastly selected positioning scheme, and satisfying the corresponding positioning condition, and if so, then the UE will perform a positional measurement according to the positioning scheme, and report a measurement result; and If the lastly selected positioning scheme does not satisfy the corresponding positioning condition, and/or there is no positioning scheme at a higher priority than the priority of the lastly selected positioning scheme, and satisfying the corresponding positioning condition, then the UE will determine whether there is a positioning scheme at a lower priority than the priority of the lastly selected positioning scheme or at the same priority as the priority of the lastly selected positioning scheme, and satisfying the corresponding positioning condition, and if so, then the UE will perform a positional measurement according to the positioning scheme, and report a measurement result.

Several particular embodiments will be described below.

In a first embodiment, the location server configures the assistance data.

Figure 2:
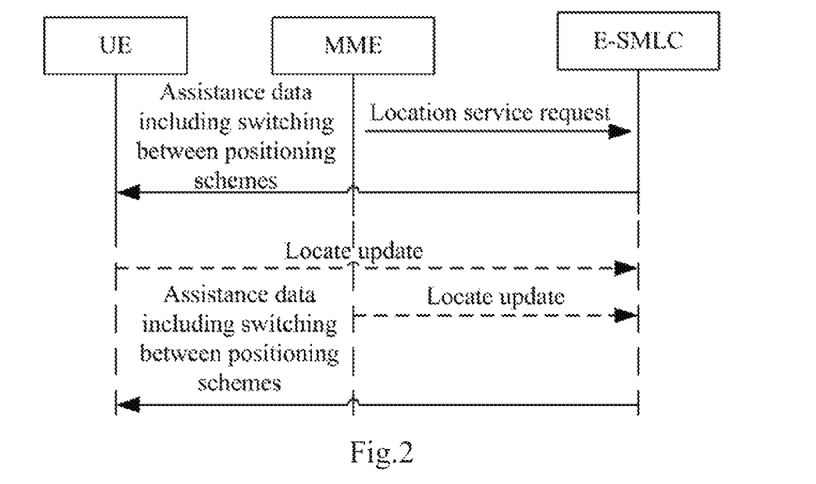
FIG. 2 is a schematic flow chart of positioning in the UE control plane according to an embodiment of the invention.

As illustrated in FIG. 2, the MME receives a location service request initiated by the UE or the GMLC or in the MME, and transmits the location service request to the E-SMLC (in the existing LTE positioning procedure); and The E-SMLC determines positioning schemes currently available to the UE, and their corresponding priorities, positioning conditions, etc., according to a location QoS parameter (e.g., location precision, a response time, etc.) carried in the location service request, and a current serving cell or positional information of the UE in combination with positioning capabilities of the UE and the network side, and transmits the determined positioning schemes and their corresponding priorities, positioning conditions, etc., to the UE in an LPP message.

For example, the E-SMLC receives the location service request currently including required positioning precision of 100 meters, and the E-SMLC can determine possible indoor WLAN coverage around the UE according to the current serving cell or positional information of the UE, so the E-SMLC further generates the assistance data to instruct the UE to select one of the positioning scheme, in combination with the positioning capabilities of the UE and the network side as follows:

In the WLAN positioning scheme at a priority of 3 and with a positioning threshold of 2, if the UE detects two WLAN signals, then it will be determined that the positioning condition is satisfied, or if the positioning condition further includes a specific SSID corresponding to a detected WLAN signal, then if the UE detects two WLAN signals broadcasting the specific SSID, then it will be determined that the positioning condition is satisfied;

In the OTDOA positioning scheme at a priority of 2 and with a positioning threshold of 3, if the UE obtains three positional measurement results in the OTDOA positioning scheme, then it will be determined that the positioning condition is satisfied; and In the RF positioning scheme at a priority of 1 and without any positioning threshold, if an RF result is obtained, then it will be determined that the positioning condition is satisfied for either a cellular network or a WLAN.

It shall be noted that the priorities are arranged in an order of ascending numbers so that a priority of 0 is the lowest priority; and moreover the available positioning schemes may be only a subset of positioning schemes supported by the UE, and positioning schemes supported by the network side instead of all the currently supportable positioning schemes at respective priorities. If a positioning scheme has no available priority, but depends upon positioning in the LTE control plane, then the UE will determine that a priority of the positioning scheme is the lowest, i.e., 0; and if a positioning scheme does not depend upon positioning in the LIE control plane, e.g., the standalone GPS positioning scheme, then the available priority thereof, and the priority of positioning in the LTE control plane will go beyond die scope of the invention, and particularly be configured specific to the UE.

As the UE is moving, the UE enters another serving cell, and at this time, the UE triggers a location update, and transmits it to the E-SMLC in an LPP message carrying the current serving cell. The E-SMLC decides whether to update the assistance data instruct to the UE to select the positioning scheme, according to the updated serving cell, and the previous result of positioning the UE. For example, if the E-SMLC determines that the UE may currently enter an outdoor environment, according to the updated serving cell, then the E-SMLC will generate and transmit to the UE new data instruct to the UE to select the positioning scheme, where the assistance data includes:

The WLAN positioning scheme at a priority of 3 and with a positioning threshold of 2;

The GPS positioning scheme at a priority of 2 and with a positioning threshold of 3 (if the UE detects three GPS signals, then it will be determined that the positioning condition is satisfied);

The OTDOA positioning scheme at a priority of 1 and with a positioning threshold of 3; and The RF positioning scheme at a priority of 0 and without any positioning threshold.

Furthermore the location update may alternatively be notified by the MME to the E-SMLC, for example, each time a handover occurs, if the MME obtains the updated serving cell of the UE, then the MME will trigger a locate update message, and notify the E-SMLC to thereby trigger the E-SMLC to determine whether to update the assistance data to instruct the UE to select one of the positioning schemes.

In a second embodiment, the UE tries to select the respective positioning schemes, in an order of descending priorities from high to low.

If the UE resides in a shopping mall in which a cellular network and a WLAN network are deployed by an operator, then a GPS signal may be detected outdoors and in some areas of the shopping mall.

In the first step, the UE receives a location information request message from the E-SMLC, where the location information request message carries the type of the current position report, which is a periodical report made at an interval of 10 s and for an indefinite number of times, and also the assistance data to instruct the LIE to select one of the positioning schemes, where the assistance data includes:

A WLAN positioning condition, a priority of 3, and a positioning threshold of 1, where the positioning threshold further includes the SSID of the WLAN to be detected is the CMCC, that is, if the UE detects one WEAN signal broadcasting the specific SSID, then it will be determined that the positioning condition is satisfied;

A GPS positioning condition, a priority of 2, and a positioning threshold of 3, that is, if the UE receives three GPS signals, then it will be determined that the positioning condition of the GPS positioning scheme is satisfied; and An OTDOA positioning condition, a priority of 1, and a positioning threshold of 3, that is, if the UE obtains three positional measurement results in the OTDOA positioning scheme, then it will be determined that the positioning condition is satisfied; and An RF positioning condition, a priority of 1, and no positioning threshold, that is, if an RF result is obtained, then it will be determined that the positioning condition is satisfied for either the cellular network or the WLAN.

Here the location information message can be but will not be to an LPP message.

In the second step, the UE attempts on the respective positioning schemes constantly in an order of descending priorities from high to low of the positioning schemes in response to the received location information request message, and since neither WLAN signal broadcasting the CMCC (China Mobile Communication Corporation) nor GPS signal is detected, the UE attempts on the OTDOA positioning scheme. The UE obtains assistance data and a measurement gap required for the OTDOA positioning scheme as in the existing positioning flow to perform a positional measurement, and reports a result of the positional measurement to the E-SMLC.

In the third step, if a periodical positioning timer expires, then the UE will restart a positional measurement. At this time, the UE still attempts on the respective positioning schemes constantly in an order of descending priorities from high to low of the positioning schemes, and if the UE detects a WLAN signal broadcasting the CMCC, then the positioning threshold of the WLAN will be satisfied, and the UE will select the WLAN positioning scheme, and report a WLAN positional measurement result to the E-SMLC for the E-SMLC to calculate the position of the UE.

Due to the periodical positioning scheme, the UE keeps on repeating the process in the third step until the E-SMLC stops positioning.

In a third embodiment, the UE attempts the last positioning scheme and a positioning scheme at a higher priority concurrently.

If the LIE resides in a shopping mall in which a cellular network, a WLAN network, and pseudo-satellite positioning for indoor positioning are deployed by an operator.

In the first step, the UE receives a location information request message from the E-SMLC, where the location information request message carries the type of the current position report, which is a periodical report made at an interval of 10 s and for an indefinite number of times, and also the assistance data to instruct the UE to select one of the positioning schemes, where the assistance data includes:

The pseudo-satellite positioning scheme at a priority of 2, and with a positioning threshold of 3, that is, if the UE receives three pseudo GPS signals, then it will be determined that the positioning condition is satisfied;

The WLAN positioning scheme at a priority of 3, and with a positioning threshold of 2, where the positioning threshold further includes the SSID of the WLAN to be detected is the CMCC, that is, if the UE detects one WLAN signal broadcasting the specific SSID, then it will be determined that the positioning condition is satisfied;

The OTDOA positioning scheme at a priority of 1, and with a positioning threshold of 3, that is, if the UE obtains three positional measurement results in the OTDOA positioning scheme, then it will be determined that the positioning condition is satisfied; and The RF positioning scheme at a priority of 0, and without any positioning threshold, that is, if an RF result is obtained, then it will be determined that the positioning condition is satisfied for either the cellular network or the WLAN.

In the second step, the UE attempts on positioning in response to the received location information request message; and since there is no last positioning scheme, the UE can determine that the priority of the last positioning scheme is the lowest, and attempt on the respective positioning schemes constantly in an order of descending priorities from high to low of the positioning schemes. Since three pseudo GPS signals are not detected, the UE attempts on the WLAN positioning scheme, and at this time, the UE detects two WLAN signals broadcasting the CMCC, and determines that the positioning condition of the WEAN is satisfied, so the UE reports a WEAN positional measurement result to the E-SMLC for the E-SMLC to calculate the position of the UE.

In the third step, if a periodical positioning timer expires, then the LIE will restart a positional measurement. Since the last positioning scheme is the WLAN positioning scheme, the UE attempts on the WLAN positioning scheme, and at this time, the UE detects two WEAN signals broadcasting the CMCC, satisfying the positioning condition corresponding to the WLAN positioning scheme, so the UE reports a WLAN positional measurement result to the network side; and the UE attempts on another positioning scheme at a higher priority than the priority of the WLAN positioning scheme, i.e., the pseudo GPS positioning scheme. At this time, if UE detects three pseudo GPS signals, satisfying the positioning condition corresponding to the pseudo GPS signals, so the UE transmits an obtained pseudo GPS positional measurement result to the network side for the network side to calculate more appropriate positional information of the UE; and If neither the WLAN positioning scheme nor the pseudo GPS positioning scheme satisfies the corresponding positioning condition, then the UE will attempt on the OTDOA positioning scheme and the RF positioning scheme in an order of descending priorities from high to low.

Due to the periodical positioning scheme, the UE keeps on repeating the process in the third step until the E-SMLC stops positioning.

Figure 3:
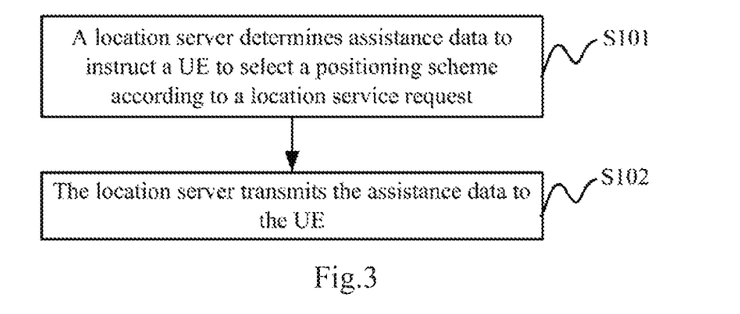
FIG. 3 is a schematic flow chart of a method for controlling a positioning scheme to be selected according to an embodiment of the invention.

In summary, referring to FIG. 3, an embodiment of the invention provides a method at the location server side for controlling a positioning scheme to be selected, where the method includes the following steps;

S101. A location server determines assistance data to instruct a User Equipment (UE) to select a positioning scheme according to a location service request; and S102. The location server transmits the assistance data to the UE.

Figure 4:
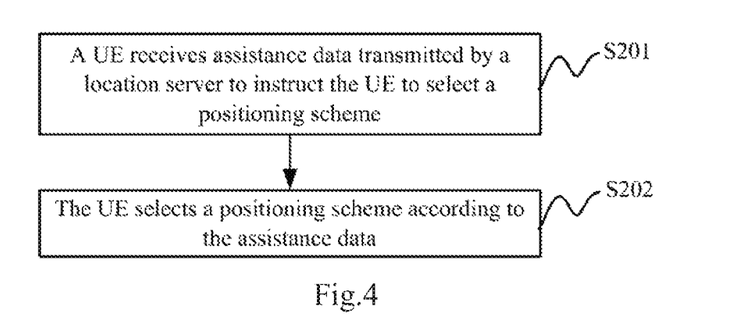
FIG. 4 is a schematic flow chart of a method for selecting a positioning scheme according to an embodiment of the invention.

Referring to FIG. 4, an embodiment of the invention provides a method at the UE side for selecting a positioning scheme, where the method includes the following steps:

S201. A UE receives assistance data transmitted by a location server to instruct the UE to select a positioning scheme; and S202. The UE selects a positioning scheme according to the assistance data.

Figure 5:
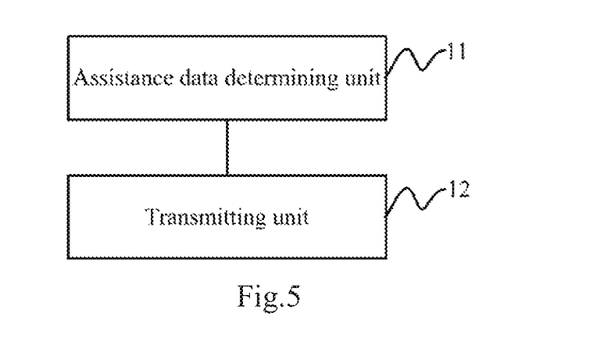
FIG. 5 is a schematic diagram of an apparatus for controlling a positioning scheme to be selected according to an embodiment of the invention.

In correspondence to the method above, referring to FIG. 5, an embodiment of the invention provides an apparatus for controlling a positioning scheme to be selected, where the apparatus includes:

An assistance data determining unit 11 is configured to determine assistance data to instruct a UE to select a positioning scheme according to a location service request; and A transmitting unit 12 is configured to transmit the assistance data to the UE.

Preferably the assistance data includes a priority and/or a positioning condition corresponding to respective one of positioning schemes currently supported by the UE;

Where the priority is a priority at which the UE is instructed to select the respective positioning scheme, and the positioning condition is a respective positioning condition to be satisfied by the positioning scheme which the UE is instructed to select at the priority, where if the positioning condition is satisfied, then it will be determined that the positioning scheme is selected; otherwise, another positioning scheme will be further selected at the priority thereof.

Preferably the assistance data determining unit is configured:

To determine the assistance data to instruct the LIE to select one of the positioning schemes, according to a Quality of Service (QoS) parameter of the location service carried in the location service request, a current serving cell or positional information of the UE, and positioning capabilities of the UE and the network side.

Preferably the transmitting unit is configured to decide to transmit the assistance data to the UE, according to an updated serving cell of the UE, and a previous result of positioning the UE upon reception of a location update message.

Preferably the apparatus for controlling a positioning scheme to be selected can be a location server, e.g., an E-SMLC, etc.

Figure 6:
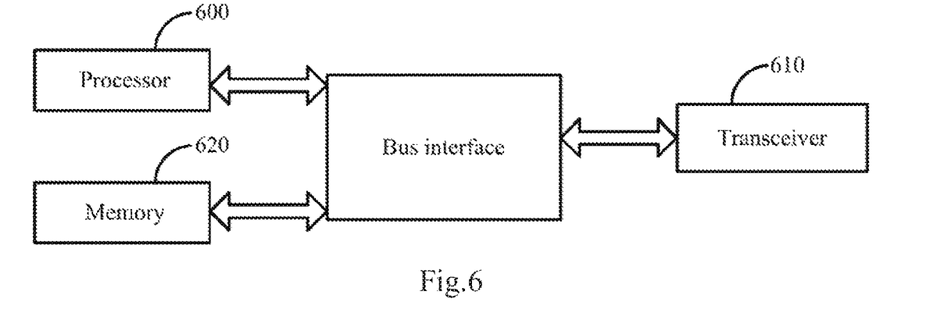
FIG. 6 is a schematic structural diagram of a location server according to an embodiment of the invention.

Referring to FIG. 6, an embodiment of the invention provides a location server including:

A processor 600 is configured to read program stored in a memory 620 to perform the process of:

Determining assistance data to instruct a UE to select a positioning scheme according to a location service request; and Transmitting the assistance data to the UE through a transceiver 610, where:

The transceiver 610 is configured to be controlled by the processor 600 to receive and transmit data; and The memory 620 is configured to store data for use by the processor 600 in operation.

Here in FIG. 6, the bus architecture can include any number of interconnected buses and bridges and particularly link together one or more processors represented by the processor 600, one or more memories represented by the memory 620, and various other circuits. The bus architecture can further link together various other circuits, e.g., peripheral devices, a voltage stabilizer, a power management circuit, etc., and all these circuits are well known in the art, so a further description thereof will be omitted in this context. The bus interface serves as an interface. The transceiver 610 can include a number of elements including a transmitter and a receiver serving as elements configured to communicate with various other devices over a transmission medium. The processor 600 is responsible for managing the bus architecture and performing other normal processes, and the memory 620 can store data for use by the processor 600 in performing the operations.

With the location server, the UE can select appropriate one of the positioning schemes according to the received assistance data for switching between the positioning schemes to thereby switch seamlessly the positioning scheme.

Preferably the assistance data includes a priority and/or a positioning condition corresponding to respective one of positioning schemes currently supported by the UE;

Where the priority is a priority at which the UE is instructed to select the respective positioning scheme, and the positioning condition is a respective positioning condition to be satisfied by the positioning scheme which the LIE is instructed to select at the priority, where if the positioning condition is satisfied, then it will be determined that the positioning scheme is selected; otherwise, another positioning scheme will be further selected at the priority thereof.

Preferably the processor configured to determine the assistance data to instruct the UE to select one of the positioning schemes is configured to read the program stored in the memory to perform the process of:

Determining the assistance data to instruct the UE to select one of the positioning schemes, according to a Quality of Service (QoS) parameter of the location service carried in location service request, a current serving cell or positional information of the UE, and positioning capabilities of the UE and the network side.

Preferably the processor configured to transmit the assistance data to the UE through the transceiver is configured to read the program stored in the memory to perform the process of: deciding whether to update and transmit the assistance data to the UE, according to an updated serving cell of the UE, and a previous result of positioning the UE upon reception of a location update message.

Figure 7:
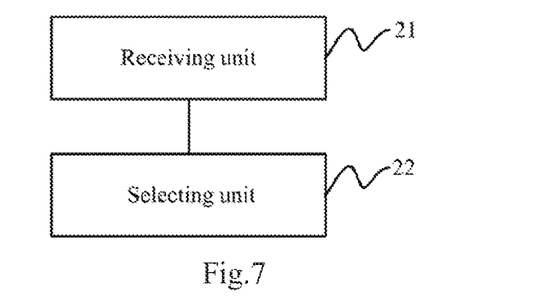
FIG. 7 is a schematic diagram of an apparatus for selecting a positioning scheme according to an embodiment of the invention.

Referring to FIG. 7, an embodiment of the invention provides an apparatus for selecting a positioning scheme, where the apparatus includes:

A receiving unit 21 is configured to receive assistance data transmitted by a location server to instruct the selecting apparatus to select a positioning scheme; and A selecting unit 22 is configured to select a positioning scheme according to the assistance data.

Preferably the assistance data includes a priority and/or a positioning condition corresponding to respective one of positioning schemes currently supported by the UE;

Where the priority is a priority at which the UE is instructed to select the respective positioning scheme, and the positioning condition is a respective positioning condition to be satisfied by the positioning scheme which the UE is instructed to select at the priority, where if the positioning condition is satisfied, then it will be determined that the positioning scheme is selected; otherwise, another positioning scheme will be further selected at the priority thereof.

Preferably if the assistance data includes the priority and the positioning condition corresponding to respective one of the positioning schemes currently supported by the UE, then the selecting unit is configured:

To select one of the positioning schemes in an order of descending priorities from high to low, and to determine whether the selected positioning scheme satisfies the positioning condition corresponding to the positioning scheme, and if so, to perform a positional measurement according to the selected positioning scheme, and to report a measurement result; otherwise, to select respective one of the positioning schemes sequentially in an order of descending priorities from high to low, and to determine whether the selected positioning scheme satisfies the positioning condition corresponding to the positioning scheme until the selected positioning scheme satisfies the corresponding positioning scheme, and to perform a positional measurement according to the finally selected positioning scheme, and to report a measurement result.

Preferably if the assistance data includes the priority and the positioning condition corresponding to respective one of the positioning schemes currently supported by the UE, then the selecting unit is configured:

To determine whether the lastly selected positioning scheme still satisfies the corresponding positioning condition;

If so, to still perform a positional measurement according to the lastly selected positioning scheme, to report a measurement result, and to determine whether there is a positioning scheme at a higher priority than the priority of the lastly selected positioning scheme, and satisfying the corresponding positioning condition, and if so, to perform a positional measurement according to the positioning scheme, and to report a measurement result; and If the lastly selected positioning scheme does not satisfy the corresponding positioning condition, and/or there is no positioning scheme at a higher priority than the priority of the lastly selected positioning scheme, and satisfying the corresponding positioning condition, to determine whether there is a positioning scheme at a lower priority than the priority of the lastly selected positioning scheme or at the same priority as the priority of the lastly selected positioning scheme, and satisfying the corresponding positioning condition, and if so, to perform a positional measurement according to the positioning scheme, and to report a measurement result.

Preferably the apparatus for selecting a positioning scheme can be a UE.

Figure 8:
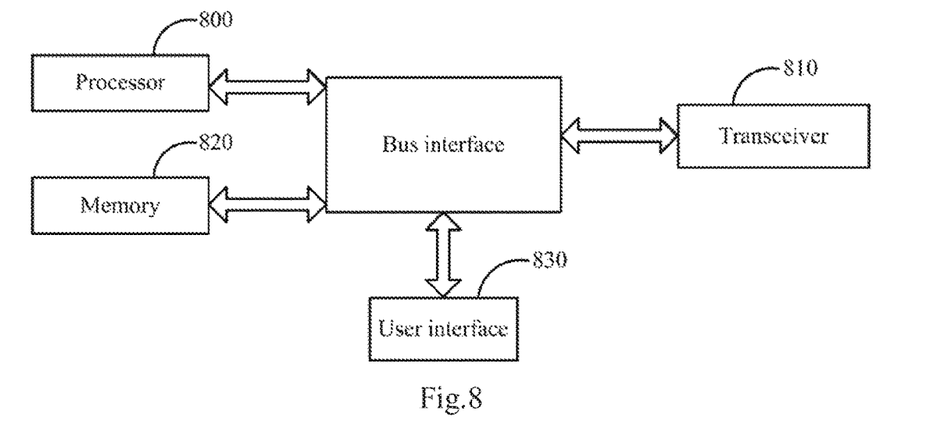
FIG. 8 is a schematic structural diagram of a UE according to an embodiment of the invention.

As illustrated in FIG. 8, an embodiment of the invention provides a UE including:

A processor 800 is configured to read program stored in a memory 820 to perform the process of:

Receiving assistance data transmitted by a location server to instruct the UE to select a positioning scheme, through a transceiver 810; and Selecting a positioning scheme according to the assistance data, where:

The transceiver 810 is configured to be controlled by the processor 800 to receive and transmit data; and The memory 820 is configured to store data for use by the processor 800 in operation.

Here in FIG. 8, the bus architecture can include any number of interconnected buses and bridges and particularly link together one or more processors represented by the processor 800, one or more memories represented by the memory 820, and various other circuits. The bus architecture can further link together various other circuits, e.g., peripheral devices, a voltage stabilizer, a power management circuit, etc., and all these circuits are well known in the art, so a further description thereof will be omitted in this context. The bus interface serves as an interface. The transceiver 810 can include a number of elements including a transmitter and a receiver serving as elements configured to communicate with various other devices over a transmission medium. For different user devices, the user interface 830 can also be an interface connected with an internal or external device as needed, and the connected device can include but will not be limited to a keypad, a display, a speaker, a microphone, a joy stick, etc.

The processor 800 is responsible for managing the bus architecture and performing other normal processes, and the memory 820 can store data for use by the processor 800 in performing the operations.

The UE can select appropriate one of the positioning schemes according to the received assistance data for switching between the positioning schemes to thereby switch seamlessly the positioning scheme.

Preferably the assistance data includes a priority and/or a positioning condition corresponding to respective one of positioning schemes currently supported by the UE;

Where the priority is a priority at which the UE is instructed to select the respective positioning scheme, and the positioning condition is a respective positioning condition to be satisfied by the positioning scheme which the UE is instructed to select at the priority, where if the positioning condition is satisfied, then it will be determined that the positioning scheme is selected; otherwise, another positioning scheme will be further selected at the priority thereof.

Preferably if the assistance data includes the priority and the positioning condition corresponding to respective one of the positioning schemes currently supported by the UE, then the processor configured to select one of the positioning schemes according to the assistance data is configured to read the program stored in the memory to perform the process of:

Selecting one of the positioning schemes in an order of descending priorities from high to low, and determining whether the selected positioning scheme satisfies the positioning condition corresponding to the positioning scheme, and if so, then performing a positional measurement according to the selected positioning scheme, and reporting a measurement result; otherwise, selecting respective one of the positioning schemes sequentially in an order of descending priorities from high to low, and determining whether the selected positioning scheme satisfies the positioning condition corresponding to the positioning scheme until the selected positioning scheme satisfies the corresponding positioning scheme, and performing a positional measurement according to the finally selected positioning scheme, and reporting a measurement result.

Preferably if the assistance data includes the priority and the positioning condition corresponding to respective one of the positioning schemes currently supported by the UE, then the processor configured to select one of the positioning schemes according to the assistance data is configured to read the program stored in the memory to perform the process of:

Determining whether the lastly selected positioning scheme still satisfies the corresponding positioning condition;

If so, then still performing a positional measurement according to the lastly selected positioning scheme, reporting a measurement result, and determining whether there is a positioning scheme at a higher priority than the priority of the lastly selected positioning scheme, and satisfying the corresponding positioning condition, and if so, then performing a positional measurement according to the positioning scheme, and reporting a measurement result; and If the lastly selected positioning scheme does not satisfy the corresponding positioning condition, and/or there is no positioning scheme at a higher priority than the priority of the lastly selected positioning scheme, and satisfying the corresponding positioning condition, then determining whether there is a positioning scheme at a lower priority than the priority of the lastly selected positioning scheme or at the same priority as the priority of the lastly selected positioning scheme, and satisfying the corresponding positioning condition, and if so, then performing a positional measurement according to the positioning scheme, and reporting a measurement result.

In summary, in the embodiments of the invention, the location server transmits the assistance data for switching between the positioning schemes to the UE; and the UE selects appropriate one of the positioning schemes according to the received assistance data for switching between the positioning schemes, and transmits the corresponding positional measurement result to the network side for the network side to calculate the positional information of the UE satisfying the required QoS.

The UE can select appropriate one of the positioning schemes as follows:

The UE performing each positional measurement attempts on the respective positioning schemes constantly in an order of descending priorities from high to low of the positioning schemes until the current positioning scheme satisfies the positioning condition; and the UE determines the positioning scheme as an appropriate positioning scheme; or The UE attempts on the positioning scheme applied in the last positioning procedure, and if the positioning scheme satisfies the positioning condition, then the UE will transmit a positional measurement result to the network side; and also the UE attempts on another positioning scheme at a higher priority than the priority of the last positioning scheme, and if the positioning scheme satisfies the positioning condition, then the UE will transmit an obtained positional measurement result to the network side for the network side to calculate more appropriate positional information of the UE. If the UE fails to determine any positioning scheme satisfying the positioning threshold in the steps above, then the UE will keep on attempting the positioning schemes at the same or lower priority as or than the priority of the last positioning scheme in an order of descending priorities from high to low until some positioning scheme satisfies the positioning condition, and transmit a positional measurement result obtained in the positioning scheme to the network side (if the last positioning scheme is absent, then it can be determined the priority of the last positioning scheme is the lowest).

As a result, the UE can select appropriate one of the positioning schemes according to the received assistance data for switching between the positioning schemes to thereby switch seamlessly the positioning scheme.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specificpurpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device an that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for selecting a positioning scheme, the method comprising:
    receiving, by a User Equipment (UE), assistance data transmitted by a location server to instruct the UE to select a positioning scheme; and
    selecting, by the UE, a positioning scheme according to the assistance data;
    wherein the assistance data comprises a priority and/or a positioning condition corresponding to respective one of positioning schemes currently supported by the UE;
    wherein the priority is a priority at which the UE is instructed to select the respective positioning scheme, and the positioning condition is a respective positioning condition to be satisfied by the positioning scheme which the UE is instructed to select at the priority, wherein when the positioning condition is satisfied, then it will be determined that the positioning scheme is selected; otherwise, another positioning scheme will be further selected at the priority thereof;
    wherein when the assistance data comprises the priority and the positioning condition corresponding to respective one of the positioning schemes currently supported by the UE, then selecting, by the UE, one of the positioning schemes according to the assistance data comprises:
    determining, by the UE, whether the lastly selected positioning scheme still satisfies the corresponding positioning condition;
    when the lastly selected positioning scheme still satisfies the corresponding positioning condition, then still performing a positional measurement according to the lastly selected positioning scheme, reporting a measurement result, and determining whether there is a positioning scheme at a higher priority than the priority of the lastly selected positioning scheme, and satisfying the corresponding positioning condition, and when there is a positioning scheme at a higher priority than the priority of the lastly selected positioning scheme, and satisfying the corresponding positioning condition, then performing a positional measurement according to the positioning scheme, and reporting a measurement result; and
    when the lastly selected positioning scheme does not satisfy the corresponding positioning condition, and/or there is no positioning scheme at a higher priority than the priority of the lastly selected positioning scheme, and satisfying the corresponding positioning condition, then determining whether there is a positioning scheme at a lower priority than the priority of the lastly selected positioning scheme or at the same priority as the priority of the lastly selected positioning scheme, and satisfying the corresponding positioning condition, and when there is a positioning scheme at a lower priority than the priority of the lastly selected positioning scheme or at the same priority as the priority of the lastly selected positioning scheme, and satisfying the corresponding positioning condition, then performing a positional measurement according to the positioning scheme, and reporting a measurement result.

2. The method according to claim 1, wherein when the assistance data comprises the priority and the positioning condition corresponding to respective one of the positioning schemes currently supported by the UE, then selecting, by the UE, one of the positioning schemes according to the assistance data comprises:
    selecting, by the UE, one of the positioning schemes in an order of descending priorities from high to low, and determining whether the selected positioning scheme satisfies the positioning condition corresponding to the positioning scheme, and when the selected positioning scheme satisfies the positioning condition corresponding to the positioning scheme, performing a positional measurement according to the selected positioning scheme, and reporting a measurement result; otherwise, selecting respective one of the positioning schemes sequentially in an order of descending priorities from high to low, and determining whether the selected positioning scheme satisfies the positioning condition corresponding to the positioning scheme until the selected positioning scheme satisfies the corresponding positioning condition, and performing a positional measurement according to the finally selected positioning scheme, and reporting a measurement result.

3. An apparatus for selecting a positioning scheme, the apparatus comprising:
    a processor, a transceiver and a memory; wherein,
    the processor is configured to read program stored in the memory to perform the process of: receiving assistance data transmitted by a location server to instruct the apparatus to select a positioning scheme, through the transceiver; selecting a positioning scheme according to the assistance data;
    the transceiver is configured to be controlled by the processor to receive and transmit data;

the memory is configured to store data for use by the processor in operation;

wherein the assistance data comprises a priority and/or a positioning condition corresponding to respective one of positioning schemes currently supported by the apparatus;

wherein the priority is a priority at which the apparatus is instructed to select the respective positioning scheme, and the positioning condition is a respective positioning condition to be satisfied by the positioning scheme which the apparatus is instructed to select at the priority, wherein when the positioning condition is satisfied, then it will be determined that the positioning scheme is selected; otherwise, another positioning scheme will be further selected at the priority thereof;

wherein when the assistance data comprises the priority and the positioning condition corresponding to respective one of the positioning schemes currently supported by the apparatus, then the processor is configured to read program stored in the memory to perform the process of:

determining whether the lastly selected positioning scheme still satisfies the corresponding positioning condition;

when the lastly selected positioning scheme still satisfies the corresponding positioning condition, still performing a positional measurement according to the lastly selected positioning scheme, reporting a measurement result, and determining whether there is a positioning scheme at a higher priority than the priority of the lastly selected positioning scheme, and satisfying the corresponding positioning condition, and when there is a positioning scheme at a higher priority than the priority of the lastly selected positioning scheme, and satisfying the corresponding positioning condition, performing a positional measurement according to the positioning scheme, and reporting a measurement result; and when the lastly selected positioning scheme does not satisfy the corresponding positioning condition, and/or there is no positioning scheme at a higher priority than the priority of the lastly selected positioning scheme, and satisfying the corresponding positioning condition, determining whether there is a positioning scheme at a lower priority than the priority of the lastly selected positioning scheme or at the same priority as the priority of the lastly selected positioning scheme, and satisfying the corresponding positioning condition, and when there is a positioning scheme at a lower priority than the priority of the lastly selected positioning scheme or at the same priority as the priority of the lastly selected positioning scheme, and satisfying the corresponding positioning condition, performing a positional measurement according to the positioning scheme, and report a measurement result.

4. The apparatus according to claim 3, wherein when the assistance data comprises the priority and the positioning condition corresponding to respective one of the positioning schemes currently supported by the apparatus, then the processor is configured to read program stored in the memory to perform the process of:

selecting one of the positioning schemes in an order of descending priorities from high to low, and determining whether the selected positioning scheme satisfies the positioning condition corresponding to the positioning scheme, and when the selected positioning scheme satisfies the positioning condition corresponding to the positioning scheme, performing a positional measurement according to the selected positioning scheme, and reporting a measurement result; otherwise, selecting respective one of the positioning schemes sequentially in an order of descending priorities from high to low, and determining whether the selected positioning scheme satisfies the positioning condition corresponding to the positioning scheme until the selected positioning scheme satisfies the corresponding positioning condition, and performing a positional measurement according to the finally selected positioning scheme, and to report a measurement result.

* * * * *